United States Patent Office 3,153,642
Patented Oct. 20, 1964

3,153,642
AZO DYESTUFFS CONTAINING A β-CYANO-
ETHYL, ALKYL AMINO SULFONYL GROUP
Herbert Ziegler, Brussels, and André Brulard, Saint Ghislain, Belgium, assignors to Societe Carbochimique Societe Anonyme, Brussels, Belgium, a Belgian company
No Drawing. Filed Dec. 19, 1960, Ser. No. 76,502
Claims priority, application Belgium, Dec. 22, 1959, 464,848
7 Claims. (Cl. 260—145)

The present invention relates to novel sulphonamido azo dyestuffs as well as their chromium and cobalt complexes which give very fast colors on natural and synthetic polyamide fibers.

The monoazo dyestuffs which form the object of the invention include a tertiary sulphamido grouping corresponding to the formula

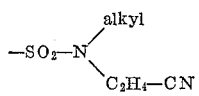

and carrying at each of the two carbon atoms in the ortho-position to the azo bridge a metallisable group such as a hydroxyl, carboxyl or amino group, or a group capable of being transformed into a metallisable group such as an alkoxy group or a halogen atom.

The compounds containing the sulphamido grouping defined above may be produced according to the invention by reacting a sulphochloride with a monoalkylamine and acrylonitrile. The order in which these operations are carried out may be varied. Thus, it is possible to cause the acrylonitrile to act upon a monoalkylamine and the resulting alkyl-(β-cyanoethyl)-amine, i.e.

NH(alkyl)—C$_2$H$_4$—CN on a sulphochloride, or to condense a sulphochloride, with a monoalkylamine and the resulting monoalkylsulphamide condensed, either immediately afterwards or at a later stage, with the acrylonitrile. It has been found that the latter condensation can be carried out especially easily and with excellent yields in water and in the presence of caustic soda or pyridine, preferably at a temperature above 35° C.

The metal dyestuffs according to the invention contain one chromium or cobalt atom associated with two azo molecules which may be identical or different but of which at least one corresponds to the definition given above.

The applicants have found that these metal dyestuffs which dye natural polyamide fibres such as wool, silk and leather, as well as synthetic fibres such as "Nylon," "Perlon" and "Rilsan" in a neutral or weakly acid medium are distinguished by outstanding properties. Due to the tertiary sulphamido grouping

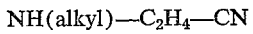

they possess a high affinity to the fibres and at the same time the hydrophilic property desirable in dyeing. These two features lead to a very good solubility during dyeing and to a perfect levelness, on the one hand, and to a remarkable fastness to wetting, on the other hand, two properties which are, in general, to be associated with difficulty. Moreover, they possess an excellent fastness to light.

The following examples illustrate the invention. Unless otherwise stated, the parts are by weight and the temperatures are given in degrees centigrade.

*Example 1*

25.5 parts of 4-[N-methyl-N-(β-cyanoethyl)-sulphamido]-2-aminophenol are dissolved in 200 parts of water and 34 parts of hydrochloric acid 19° Bé. The mixture is cooled to 0° and diazotized with a solution of 6.9 parts of sodium nitrite. The suspension of the diazonium salt is added to a solution of 18.4 parts of 1-phenyl-3-methyl-pyrazolone-(5) in 300 parts of water and 31 parts of sodium carbonate. When the coupling is terminated, the dyestuff is separated with 5% of its volume of salt and filtered. After drying, it has the appearance of a reddish brown powder.

The monoazo dyestuff is dissolved in 120 parts of formamide containing 10 parts of chromium formate (mol. weight 187). The mixture is heated to 120° for 1 hour. After cooling to about 95°, 500 parts of hot water are slowly added, the mixture is allowed to cool to ambient temperature and filtered. The cake is heated to the boil with 250 parts of water and 2 parts of caustic soda for 15 minutes. After cooling, the dyestuff is separated with 5% of its volume of salt and filtered. After drying, the dyestuff constitutes a dark red water-soluble powder which dyes polyamide fibres, especially wool, from a neutral or weakly acid bath in an orange shade of excellent fastness to light and wetting.

Dyestuffs of similar shades are obtained by replacing 4-[N-methyl-(β-cyanoethyl)-sulphamido]-2-aminophenol by 4-[N-ethyl-N-(β-cyanoethyl)-sulphamido]-2-aminophenol or by 4-[N-butyl-N-(β-cyanoethyl)-sulphamido]-2-aminophenol.

The amines used for the production of the azo compounds can be obtained by condensation of 3-nitro-4-chlorobenzene-sulphochloride with monomethylamine, monoethylamine or monobutylamine-(n), followed by hydrolysis of the chlorine and condensation with acrylonitrile, the nitro group being finally reduced to an amino group. The amines have the following melting points: methyl derivative: 154°, ethyl derivative, 154°, n-butyl derivative, 64°.

*Example 2*

25.5 parts of 5-[N-methyl-N-(β-cyanoethyl)-sulphamido]-2-aminophenol are dissolved in 1000 parts of water and 34 parts of hydrochloric acid 19° Bé. The mixture is cooled to 5–10° and diazotized with a solution of 6.9 parts of sodium nitrite. The solution of the diazonium salt is added to a solution of 18.4 parts of 1-phenyl-3-methyl-pyrazolone-(5) in 300 parts of water and 31 parts of sodium carbonate. When the coupling is terminated, the dyestuff is separated with 5% of its volume of salt and filtered. After drying, it has the appearance of an orange powder.

The transformation into the chromium complex compound is carried out according to the method described in Example 1. The chromium dyestuff is obtained as a red powder which is readily water-soluble. It dyes polyamide fibres especially wool from a neutral or weakly acid bath in a red shade of excellent fastness to light and wetting.

The amine used for the preparation of the azo dyestuff melts at 115°. It is obtained by condensation of benzoxazolone sulphochloride-(6) with methylcyanoethyl-amine and subsequent hydrolysis of the oxazolone ring.

*Example 3*

25.5 parts of 4-[N-methyl-N-(β-cyanoethyl)-sulphamido]-2-aminophenol are diazotized as described in Example 1 and the diazonium salt is coupled with 15 parts of β-naphthol dissolved in 500 parts of water, 39 parts of caustic soda solution 36° Bé. and 12 parts of sodium carbonate. The azo dyestuff thus prepared is separated by filtration. After drying, it has the appearance of a dark brown powder.

The monoazo dyestuff is pasted with 3000 parts of water and 20 parts of crystalline sodium acetate. 15 parts of crystalline cobalt sulphate in 100 parts of water are added and the whole is brought to the boil for an hour. The cobalt complex compound is separated in the cold by filtration. After drying, it is obtained as a dark violet powder which is easily soluble in hot water and dyes natural and synthetic polyamide fibres from a neutral or weakly acid bath in a bordeaux shade of excellent fastness to light and washing.

*Example 4*

The simultaneous transformation of an equimolecular mixture of the monoazo dyestuffs described in Examples 1 and 2 into chromium complexes of the 1:2 type according to the process described in Example 1 yields a dyestuff having the appearance of black powder which is easily soluble in hot water and dyes wool, natural silk, nylon etc. from a neutral or weakly acid bath in a very fast reddish brown shade.

*Example 5*

41.1 parts of the monoazo compound of Example 3 and 36.6 parts of the dyestuff obtained by coupling 5-nitro-2-aminophenol with 1-acetylamino-7-naphthol are dissolved in 4000 parts of water with 27 parts of caustic soda and heated under reflux for 10 hours with a solution of sodium chromosalycilate corresponding to 5.7 parts of chromium. The product is separated with 15% of its volume of salt and filtered. After drying and grinding, the dyestuff is obtained as an easily water-soluble black powder which dyes polyamide fibres in black shades very fast to light and wetting.

*Example 6*

In 2000 parts of water at 40° C. are consecutively dissolved 0.5 part of the metal dyestuff, described in Example 1, and 3 parts of ammonium phosphate or ammonium sulphate. By the addition of 1 part of 30% acetic acid, the pH of the bath is brought to 6.5.

50 parts of washed wool are immersed in this bath and agitated at first at 40° for 10 minutes.

The bath is then heated continuously to the boil within 30 minutes and boiling is maintained for ¾ to 1 hour.

After rinsing and drying, the material is dyed in a vivid orange.

We claim:

1. An azo complex containing one mol of a metal selected from the group consisting of cobalt and chromium and two mols of at least one monoazo dyestuff selected from the group consisting of compounds having the structural formulas:

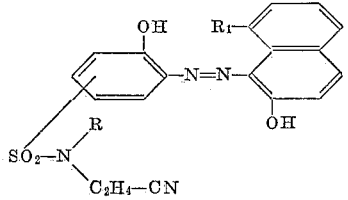

and

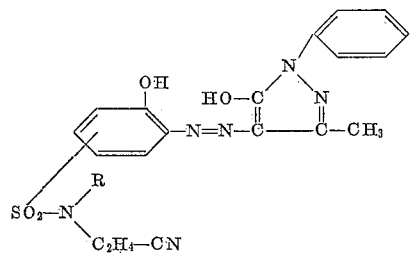

wherein R is a lower alkyl radical, $R_1$ is selected from the group consisting of hydrogen and acetylamino and the tertiary sulfoamido is in the 4- and 5-positions relative to the hydroxy group.

2. Monoazo dyestuffs selected from the group consisting of compounds having the structural formulas:

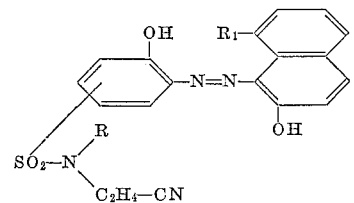

and

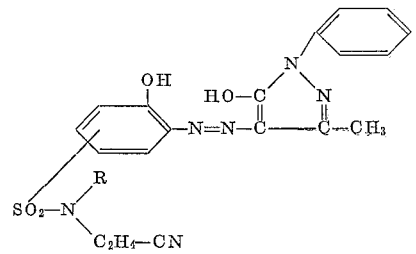

wherein R is a lower alkyl radical, $R_1$ is selected from the group consisting of hydrogen and acetylamino and the tertiary sulfoamido is in the 4- and 5-positions relative to the hydroxy group.

3. The chromium azo complex containing one mol of chromium and two mols of the monoazo compound having the formula:

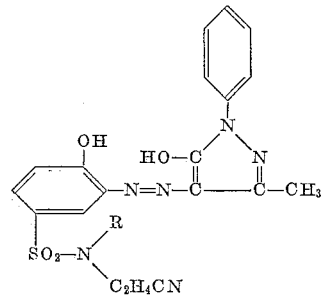

wherein R is a lower alkyl radical.

4. The chromium azo complex containing one mol of chromium and two mols of the monoazo compound having the formula:

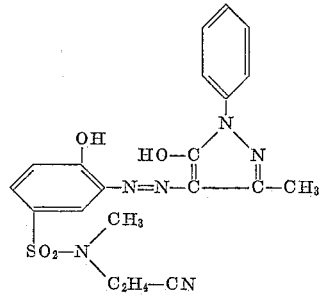

5. The cobalt azo complex containing one mol of cobalt and two mols of the monoazo compound having the formula:

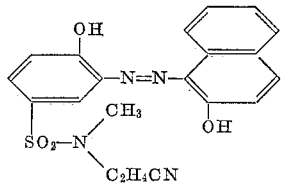

6. The chromium azo complex containing one mol of chromium, one mol of the monoazo compound having the formula:

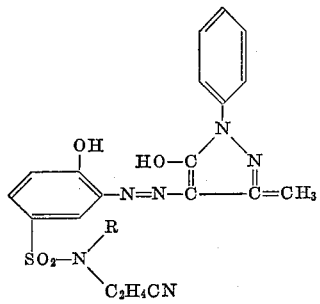

wherein R is a lower alkyl radical and one mol of the monoazo compound having the formula:

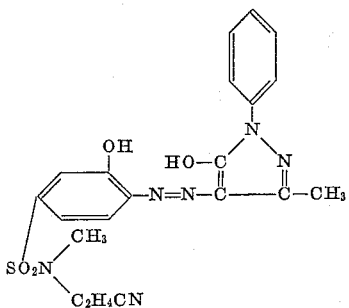

7. The chromium azo complex containing one mol of chromium, one mol of the monoazo compound having the formula:

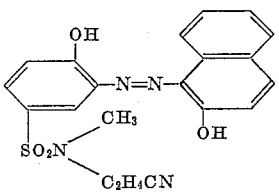

and one mol of the monoazo compound having the formula:

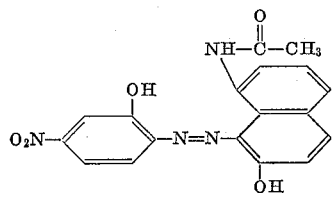

References Cited in the file of this patent
UNITED STATES PATENTS

| | | |
|---|---|---|
| 2,711,404 | Schetty | June 21, 1955 |
| 2,727,031 | Zickendraht et al. | Dec. 13, 1955 |
| 2,778,816 | Buehler et al. | Jan. 22, 1957 |
| 2,868,774 | Straley et al. | June 13, 1959 |
| 2,979,503 | Armento et al. | Apr. 11, 1961 |
| 2,980,666 | Merian et al. | Apr. 18, 1961 |

FOREIGN PATENTS

| | | |
|---|---|---|
| 560,389 | Italy | Apr. 4, 1957 |
| 811,521 | Great Britain | Apr. 8, 1959 |